(12) United States Patent
Labelle

(10) Patent No.: US 7,079,711 B2
(45) Date of Patent: Jul. 18, 2006

(54) METHOD AND DEVICE FOR VALIDATING PARAMETERS DEFINING AN IMAGE

(75) Inventor: Lilian Labelle, St Samson sur Rance (FR)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 10/094,657

(22) Filed: Mar. 12, 2002

(65) Prior Publication Data

US 2002/0191021 A1  Dec. 19, 2002

(30) Foreign Application Priority Data

Mar. 12, 2001 (FR) .................................. 01 03316

(51) Int. Cl.
  *G06K 9/54* (2006.01)
  *G06K 9/60* (2006.01)
(52) U.S. Cl. .................. 382/305; 345/427; 345/684; 715/722; 715/728; 715/737; 715/851; 715/968; 707/5
(58) Field of Classification Search ................ 382/306, 382/230, 305; 345/157, 427; 715/968, 965, 715/851, 737, 722, 728
See application file for complete search history.

(56) References Cited

U.S. PATENT DOCUMENTS

| | | | |
|---|---|---|---|
| 4,721,951 A * | 1/1988 | Holler .......................... 345/603 |
| 5,043,713 A * | 8/1991 | Katsura et al. ............... 345/563 |
| 5,367,454 A * | 11/1994 | Kawamoto et al. ........ 715/706 |
| 5,552,805 A * | 9/1996 | Alpher ........................ 345/597 |
| 5,579,471 A | 11/1996 | Barber et al. ............... 395/326 |
| 5,751,286 A | 5/1998 | Barber et al. ............... 345/348 |
| 5,915,250 A | 6/1999 | Jain et al. ..................... 707/100 |
| 5,966,126 A * | 10/1999 | Szabo ........................... 715/762 |
| 6,326,988 B1 * | 12/2001 | Gould et al. ................. 715/850 |
| 6,463,433 B1 * | 10/2002 | Baclawski ..................... 707/5 |
| 6,833,848 B1 * | 12/2004 | Wolff et al. .................. 715/719 |

FOREIGN PATENT DOCUMENTS

WO  WO99/34280  7/1999

* cited by examiner

*Primary Examiner*—Bhavesh M. Mehta
*Assistant Examiner*—Manav Seth
(74) *Attorney, Agent, or Firm*—Fitzpatrick, Cella, Harper & Scinto

(57) ABSTRACT

The present invention describes a method of validating parameters defining an image, each parameter being represented by one of the tops of a polygon and being able to be associated with one or more functionalities. A point, being able to move in the polygon, makes it possible to validate the parameters and the associated functionalities according to the position of this point with respect to the tops of the polygon. The present invention also describes a search method including at least one parameter validation step as described above.

25 Claims, 8 Drawing Sheets

METHOD AND DEVICE FOR VALIDATING PARAMETERS DEFINING AN IMAGE

BACKGROUND OF THE INVENTION

1. Field of the Invention

The present invention concerns a method of validating parameters defining an image.

The invention also concerns a method of seeking images, amongst a plurality of stored images including a step of validating search parameters as mentioned above.

2. Description of the Related Art

The present invention also concerns a device able to implement such methods of validating parameters and seeking images.

The increase in exchanges of multimedia information has given rise to requirements for seeking and/or sequencing digital images. Amongst the recently developed technologies on the use of digital images, one of the most important is certainly the indexing of visual information. This is because, in order to be able to manipulate such information, it is, amongst other things, essential to have tools which will make it possible to organize these(images, so as to be able to access them rapidly, but also to be able to find a certain number of them, with similar contents, amongst a multitude of images which may be stored locally or in a distributed fashion.

In a traditional system for seeking digital images such as are currently found on the Internet, the users seek images using keywords. In such a system, the creator of the database associates, with each of these items of visual information, a set of keywords which describe in general its visual content. For this, he must interpret the content of the image and transform the perception which he has of this content into words which he associates with the image thus described. However, these textual descriptors are often inadequate for describing an image, quite simply because the same image can be described in different ways by different creators. It can also be remarked that it is easier, for a user, to seek an image according to its content by specifying an example image rather than using keywords with which it is often difficult or even impossible to describe what an image contains.

It can therefore be seen that the traditional systems for seeking images are limited and that it is essential to define a system which makes it possible to extract a description of the visual content of these images in an automatic or semi-automatic fashion. These systems are known as systems for the indexing of visual information, based on the content.

The aim of a system for seeking digital images based on the content is to extract, from amongst a set of images stored in a database, a subset of images which best respond to a request from a user. This user can be a human being or any other means capable of specifying a request understandable by a machine.

Essential to such systems, man/machine interfaces are crucial since they make it possible to transform a request from a user in the form of a language which is understandable to the machine and to present the result of the request in a user-friendly fashion. The graphical interfaces of a, system for indexing/seeking images can be broken down into two parts. The first consists of giving means to a user for formulating a request, that is to say to choose, for example, the parameters defining a digital image, to which the search will relate. These parameters can be obtained automatically from an image or in the form of textual annotations which the user associates with each stored image. The second part is a window which displays a set of images classified according to their degree of similarity to the request. In general, the image at the top left is the most similar whilst the one at the bottom right is the least similar.

The indexing of images, based on the content, is a recent research field. This is because it is only since the start of the 80s that the need has been felt to be able to find audio-visual information according to its semantic content rather than only according to its non-semantic characteristics such as the name, size or format of the file which contains it or a set of keywords which is associated with it.

The first image indexing systems are beginning to see the light of day and some companies are awaiting the establishment of thy MPEG-7 standard in order to finalize their prototypes and give birth to commercial products.

It is possible to cite, for example, QBIC ("Query By Image Content") from IBM described in the patent U.S. Pat. No. 5,579,471 and which consists of characterizing the content of an image using the distribution of the colors and/or the texture in this image. Thus, with each image stored in the database interrogated there is associated an index composed of a component representing the color, and/or a component representing the texture of the image.

During the search phase, the user has the possibility of defining a request through a graphical interface composed essentially of two parts. The first consists of choosing an example image or creating a synthetic example image using a palette of colors and texture models. Next, where the user has chosen to base the search on both the color and the texture, he allocates a numerical value to each of these parameters. This value characterizes the relative importance of the two parameters used for calculating the similarity between the example image and an image stored in the database.

Once this request has been defined, the search method is as follows. First of all, the process identifies whether the search is to be based on one or more parameters. For this, the process is based on the numerical values associated with each of the search parameters. Secondly, it identifies whether the research can be based on the parameters specified by the user (color and/or texture) by analyzing the content of the index associated with the image in the database currently being processed. According to the result of this analysis, a measurement of similarity is associated with this current image. It may be based on the parameter or parameters specified at the time of the request or be based only on a small set of these parameters. Finally, once each image in the database has been processed, the images are sorted according to their degree of similarity with the example image.

The request thus given by the user requires, on the part of the user, a significant knowledge of the visual content of the image and on the way of characterizing the search parameters. In addition this system does not make it possible to associate a parameter with a functionality which could be enabled when the parameter is validated by the user.

Current systems offer possibilities for the user to define a request on image search parameters. Most often, this user requires sufficient knowledge of the field of the digital image in order to be able to define a request. In addition, the systems of the state of the art do not make it possible to associate a functionality which could be enabled at the time of selection or validation of a parameter by the user. Indeed the user may wish to define a request by means of a non-visual parameter, for example audio. He may also wish to define a request relating to both visual and non-visual parameters of the image.

SUMMARY OF THE INVENTION

The present invention aims to remedy the aforementioned drawbacks.

The present invention proposes a method of validating parameters defining a digital image, making it possible to take into account several types of parameter, in a simple and user-friendly fashion for a user who does not necessarily know the technical field.

To this end, the present invention relates to a method of validating parameters defining an image, each parameter being represented by one of the tops of a polygon, a point being able to move in the polygon, wherein at least one of the parameters is validated according to the position of the point with respect to the tops of the polygon.

Thus the movement of a single point makes it possible to validate several parameters and the associated functionalities. The operation is simple and user-friendly.

According to a preferred embodiment, at least one functionality can be associated with at least one parameter.

According to a preferred embodiment, the distance between one of the tops of the polygon and the point defines the weight to be allocated to the parameter represented by said top.

The weighting of one parameter with respect to another becomes more explicit since it is done visually by means of a difference in distance with the tops of the polygon. It is in fact more intuitive to move a point than to enter weighting values.

According to a particular embodiment of the invention, the polygon is a triangle.

This therefore makes it possible to define three parameters and to weight them with respect to the others.

According to another preferred embodiment, one of the functionalities associated with a parameter is the use of a device.

By choosing a parameter, the user is offered the possibility of using a device.

According to a particular embodiment of the invention, the device is a microphone.

The user can thus use the microphone if one of the parameters which he has chosen is associated with this device. The use of this microphone was not offered to him before he had chosen this parameter.

According to another particular embodiment of the invention, the polygon and a name of the device are displayed on the same screen. The availability of the device is decided according to the position of the point and the intensity of the display of the name of the device varies according to whether or not the device is available.

Thus the display of the chosen parameters is immediate and explicit.

According to another aspect of the embodiment of the invention, the parameters represented by the three tops of the triangle are color, texture and audio parameters.

This therefore makes it possible to define an image by means of two visual characteristics and one audio characteristic and to choose amongst these three parameters according to the required application of the image.

According to another particular embodiment, the point is situated at a predetermined position within the polygon at the initial stage. This predetermined position is close to one of the tops of the polygon.

According to one aspect of the embodiment, a means for moving the point in the polygon and a means for validating the position of the point in the polygon in order to validate the parameters and/or the associated functionalities are displayed on the same screen as the polygon.

Thus the user needs only one interface in which the information on the parameters and the means of validating them are grouped together at the same time.

According to one embodiment, the parameters are displayed close to their respective top of the polygon and the intensity of the display of these parameters varies according to the position of the point.

This enables the user to easily recognize the parameters Which he is in the process of choosing.

According to a particular embodiment, at least one of the tops of the polygon represents a plurality of parameters, it being possible to validate this plurality of parameters. The plurality of parameters relates to a common characteristic of the image.

This can in fact make it possible to choose a set of parameters which together define a characteristic of the image. Grouping them together enables the user not to waste time selecting each parameter in order to define this characteristic. In the same way as before, the plurality of parameters is displayed with the characteristic of the image close to the top of the polygon.

The present invention also concerns a device for validating parameters defining an image, each parameter being represented by one of the tops of a polygon, a point being able to move in the polygon.

In accordance with the invention, this parameter validation device has means of positioning the point with respect to the tops of the polygon in order to validate the parameters.

This validation device has advantages and characteristics similar to those described previously for the validation method which it implements.

According to a practical characteristic of the invention, the means of positioning the point consist of a pointer and an input means, said pointer being the point moving in the polygon by acting on the input means.

According to a second aspect, the present invention concerns a method of seeking images amongst a plurality of images stored in a database, each of the stored images being associated with an item of data called the stored image index, representing at least one parameter of the image. This search method is characterized by the fact that it includes at least one search parameter validation step according to the parameter validation method in accordance with the invention and described above.

Thus the user can define an image search request on several parameters, in a simple and intuitive fashion.

Correlatively, the invention concerns a device for seeking images amongst a plurality of images stored in a database, each of the stored images being associated with an item of data called the stored image index, representing at least one parameter of the image. This search device has means adapted to implement an image search method according to the invention and described above.

The device also includes a parameter validation device according to the invention.

The present invention also relates to a digital photographic apparatus having means adapted to implement the parameter validation method and/or an image search method, as defined above.

The present invention relates to a digital photographic apparatus having an image search device according to the invention.

The invention also concerns an information storage means which can be read by a computer or by a microprocessor, integrated or not into the device, possibly removable, storing a program implementing the method according to the invention.

The invention also concerns a computer program on a storage medium and comprising computer executable instructions for causing a computer to validate parameters defining an image, according to the previously disclosed method.

Other particularities and advantages of the invention will also emerge from the following description.

BRIEF DESCRIPTION OF THE DRAWINGS

In the accompanying drawings, given by way of non-limiting examples.

DETAILED DESCRIPTION OF THE INVENTION

Figure 1:
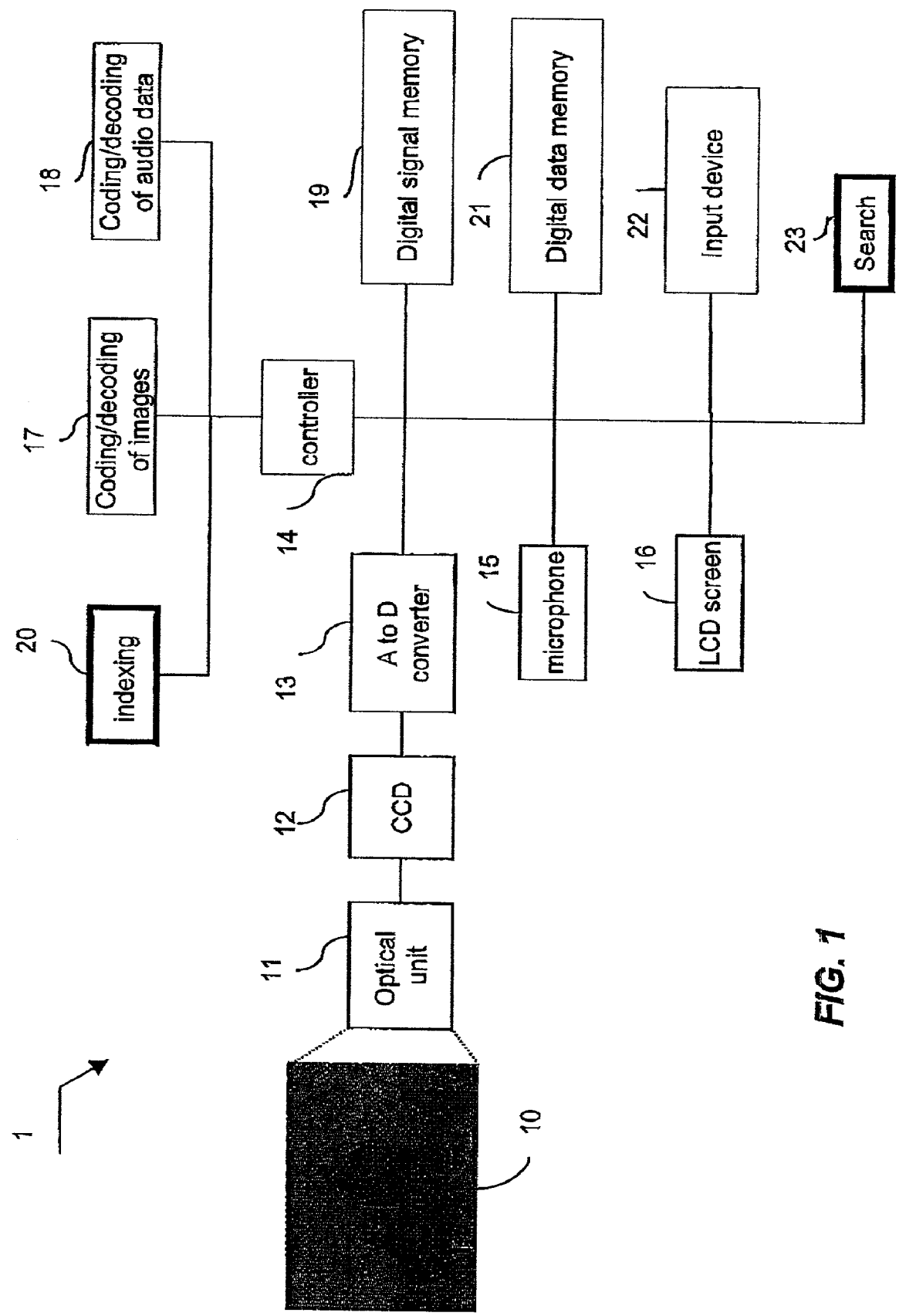
FIG. 1 is a block diagram illustrating a photographic apparatus adapted to implement the invention.

A description will be given first of all, with reference to FIG. 1, of an embodiment adapted to implement a method of validating parameters and/or seeking images according to the present invention. Thus an image and/or video capture device will be described, such as a digital photographic apparatus.

The device 1 for acquiring digital signals or capturing images has a digital data memory 21 and a digital signal memory 19 which can be grouped together in the same memory. The memories 19 and 21 have means which make it possible to transmit, in a synchronized fashion, the digital signals and the information associated with them. The device 1 includes a device 22 which makes it possible to enter the different modes of the photographic apparatus, the digital signal encoding/decoding parameters and the search parameters, of a search circuit 23 which classifies all the signals chosen according to their similarity with the parameters of a request made by the user of the image capture device. It also has an LCD (Liquid Crystal Display) screen 16 which makes it possible to visualize one or more images, and to display the graphical interface which will enable the user to define his request. The latter will be described by means of FIGS. 5 and 6.

In addition, the device consists of an image acquisition system which includes an optical unit 11 connected to a CCD sensor 12, itself connected to an analog to digital converter 13, of an indexing circuit 20. It also consists of an image encoding/decoding circuit 17, an audio signal encoding/decoding circuit 18, a microphone 15 coupled to an audio signal recording device, not shown in FIG. 1, and a controller 14 which ensures that the entire device functions correctly.

The process of acquiring a new image according to the device 1 of FIG. 1 is as follows. The user sets the device 1 in "acquisition" mode through an input device 22. The device 1 then requests the user to enter encoding parameters by displaying, for example, a message on the screen 16. The user then enters, using the device 22, those parameters which are stored in the memory 21. The device 1 is then ready to acquire a new image from the acquisition system of the device 1.

When a new image 10 is captured by this acquisition system, it is encoded according to the encoding parameters stored in the memory 21, using the encoding circuit 17. According to the preferred embodiment of the invention, the encoding circuit is a JPEG circuit. The encoded image is stored in the memory 19. The newly acquired image is decoded according to the circuit 17 and displayed on the screen 16.

This time, the user has the possibility of associating an audio signal with this image through the microphone 15. This signal is then encoded, according to the circuit 18 and using the encoding parameters stored in the memory 21. The signal thus encoded is stored in the memory 19 in association with the last image acquired.

Thus the memory 19 will contain images encoded in the JPEG format and which can be associated with audio signals. According to the preferred embodiment of the invention, the audio encoder used is the "wave sound" encoder traditionally used in photographic apparatus.

The memory 19 is for example a removable memory such as a flash memory or compact disc (CD).

As soon as the user wishes to index the images in the memory 19, he positions the device 1 in the "indexing" mode through the input device 22. Consequently, an index is associated with each of the images stored according to the method which will be described by FIG. 3. These indexes are stored in the memory 21.

Figure 4:
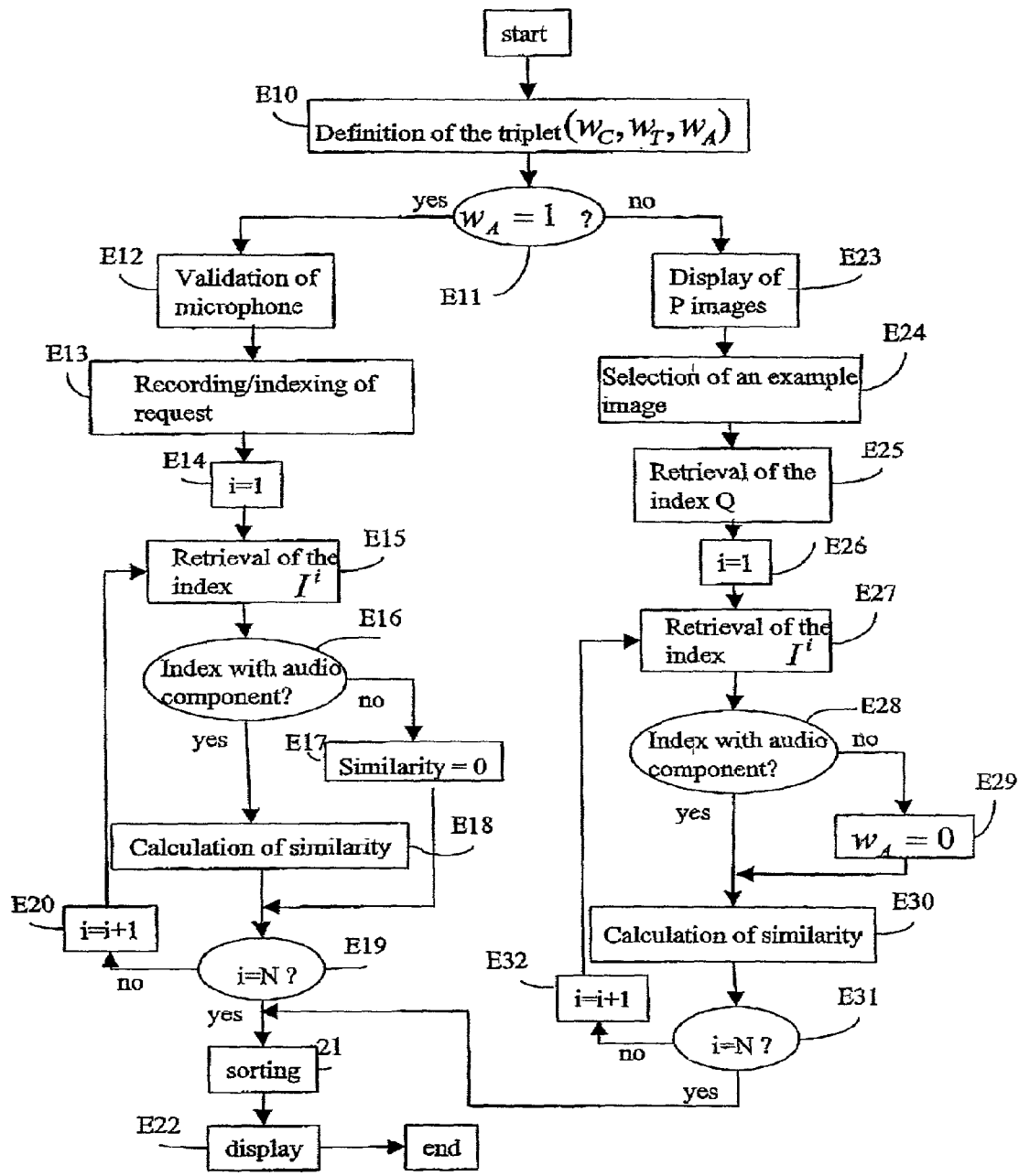
FIG. 4 represents an algorithm illustrating the image search method according to the invention.
Figure 5:
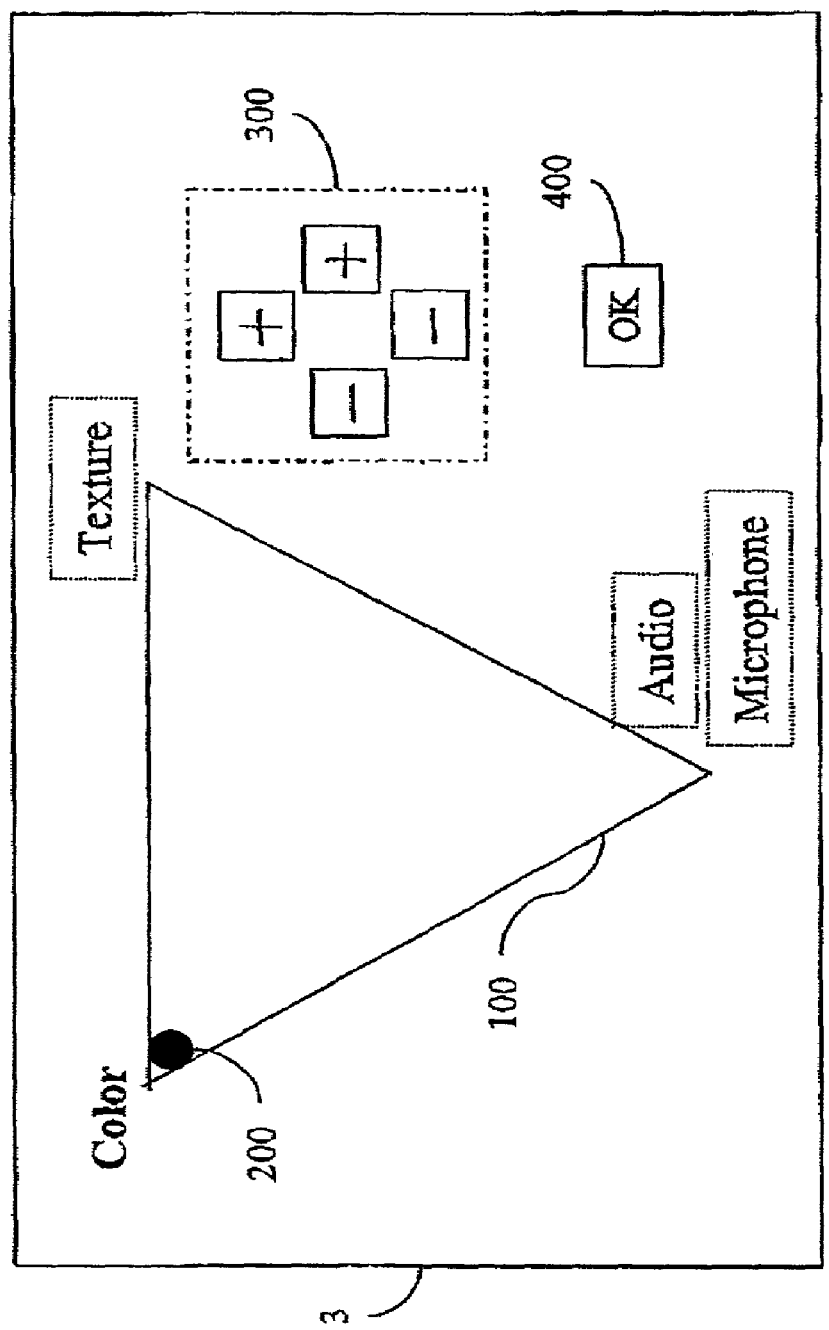
FIG. 5 is an example of a representation of the graphical interface of the parameter validation device according to the invention.

Once the images have been indexed, the user has the possibility of seeking a set of images. For this, the user positions the device 1 in "search" mode through the device 22. The graphical interface which will be described by FIG. 5 is then displayed on the screen 16, indicating that the device 1 is ready to receive a request. The user can then choose, by means of the device for validating parameters defined amongst other things by the screen 16 and the input device 22, the parameters which will be used for the search. the search method will be described by FIG. 4.

According to one embodiment of the invention, the means of using the device are incorporated in:
a microprocessor,
a read only memory containing a program for encoding, indexing and seeking the data, and
a read-write memory containing registers adapted to record variables modified during the execution of said programs.

In general terms, an information storage means, which can be read by a computer or by a microprocessor, and possibly removable, is adapted to store a program implementing the parameter validation and/or image search methods according to the invention It should be noted that the digital photographic apparatus illustrated in FIG. 1 constitutes a particular embodiment of the invention.

A description will now be given, with reference to FIG. 2, of a block diagram illustrating the general architecture of an image search device 2 according to the invention.

The device 2 uses a digital data storage unit 30 which can form part of the device or be external to it. This storage unit can be local or distributed and have digital images created by acquisition apparatus such as a, scanner, a photographic apparatus or a camcorder. This storage means also contains audio signals which can be associated with the digital images and which are created by audio signal acquisition apparatus. These digital images or these audio signals can be stored in the storage unit 30 in encoded or compressed form. They will then be decoded or decompressed by a decoding device, not shown here, before being processed.

The device 2 also has means 40 of indexing digital signals which associate an index with each signal which will be processed by the invention by means of the search method. This index is stored in the digital data memory 50. The indexing method will be described in the description of FIG. 3.

The device 2 also has a parameter validation device 90 which makes it possible, using a graphical interface, to define a request. At the time of this request, the user can validate the parameters which he wishes to use for the search. The device 2 also has a search module which classifies all the signals chosen according to their similarity with the parameters of the request. FIG. 4 will describe this search method.

The device 2 also has means 60 of displaying the signals thus classified. Finally, the device 2 has a controller 70 which ensures the correct functioning of the entire device.

Figure 2:
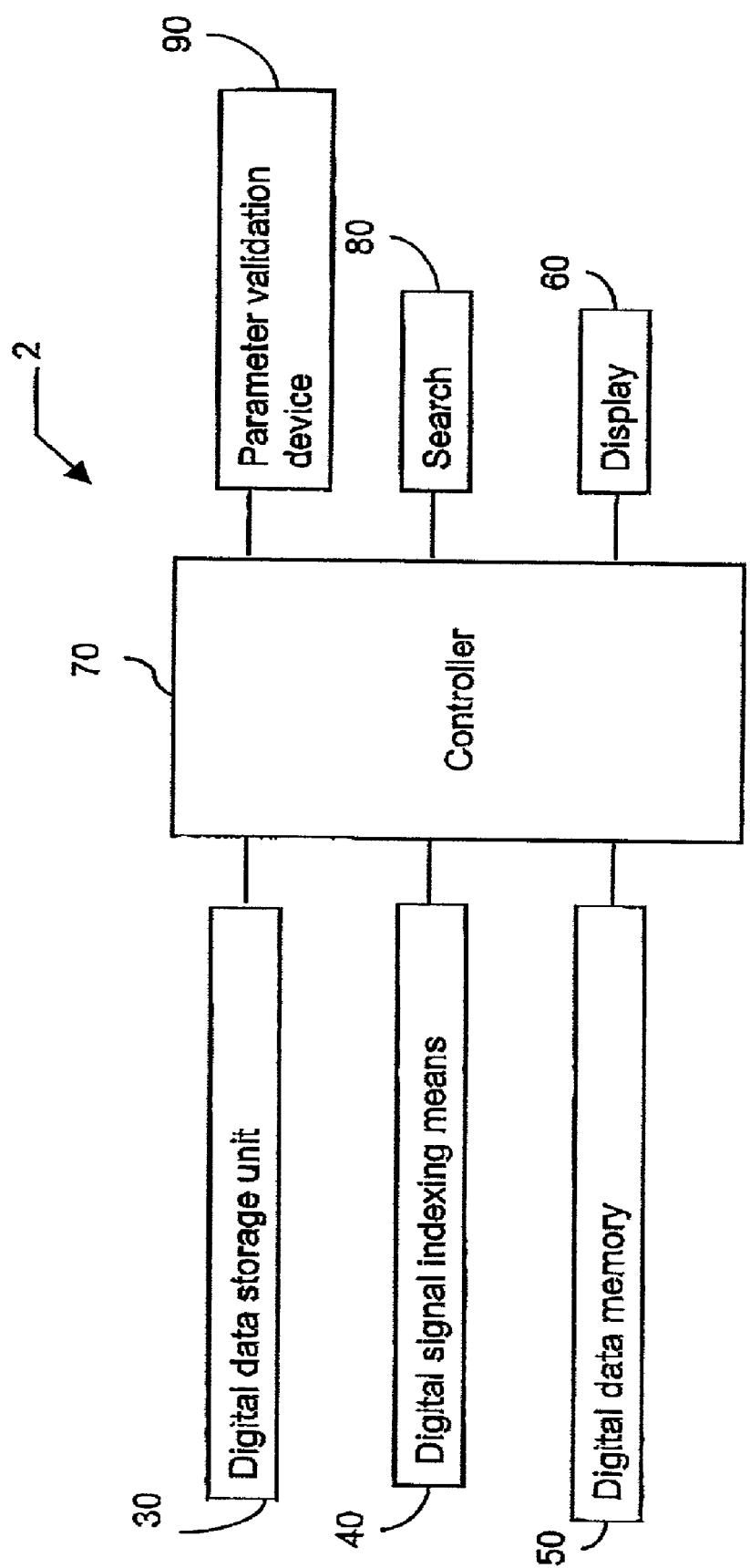
FIG. 2 is a block diagram illustrating the general architecture of an image search device according to the invention.

The device of FIG. 2 can be integrated into a digital apparatus, such as a computer, a printer, a facsimile machine, a scanner or a digital photographic apparatus.

According to one embodiment of the invention, the means of using the device are incorporated in:

a microprocessor, a read only memory containing a program for encoding, indexing and seeking the data, and a read-write memory containing registers adapted to record variables modified during the execution of said programs.

Figure 3:
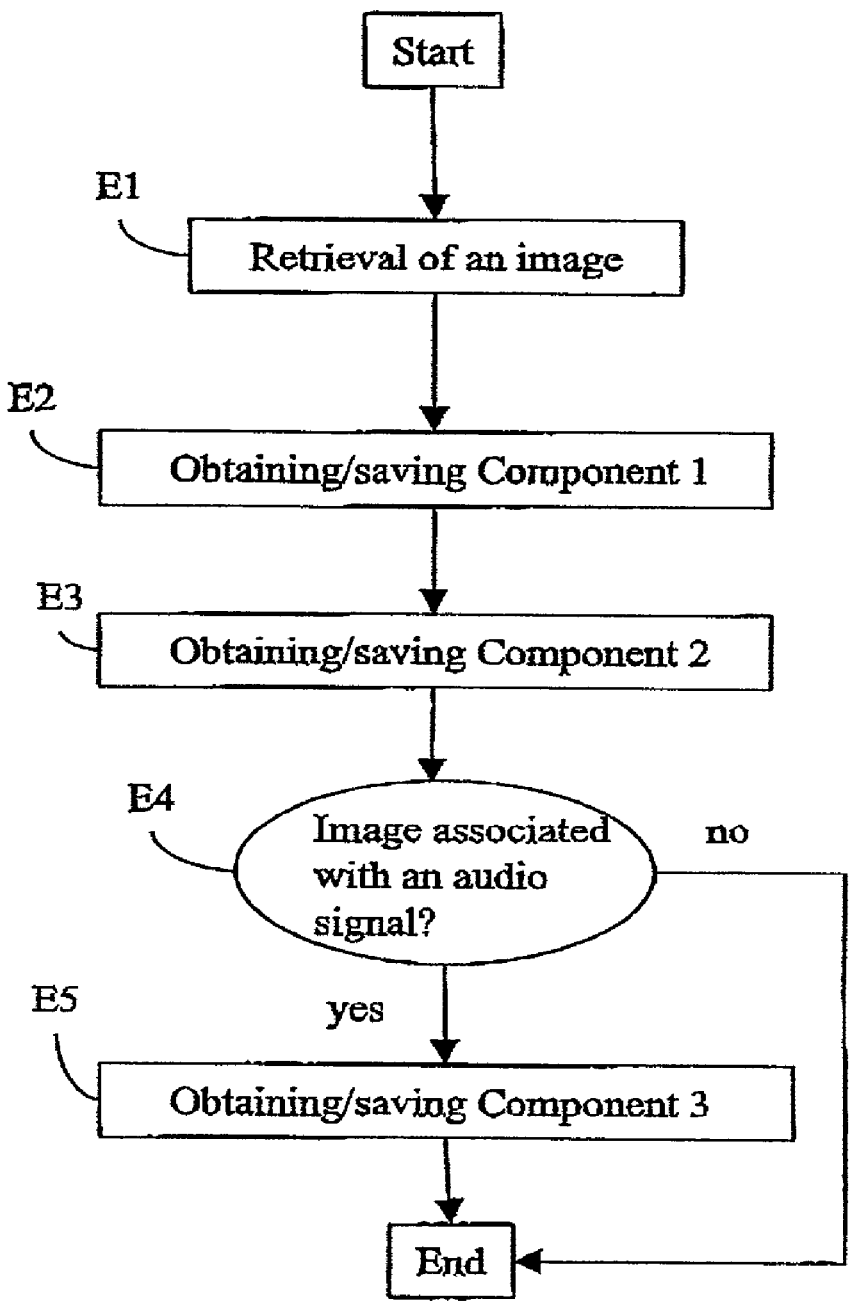
FIG. 3 represents an algorithm illustrating the indexing method used in the invention.

With reference now to FIG. 3, the algorithm illustrating the indexing method as used in the invention will be described.

The indexing method associates an index with each image coming from the storage unit 10 of FIG. 1. This index can have several components. In the preferred embodiment of the invention, the index can have three or two components depending on whether or not the image is associated With an audio signal. According to the preferred embodiment of the invention, the first two components of the index will characterize the visual content of the image and the third component will characterize the content of the audio signal associated with the image.

Step E1 of FIG. 3 is a step of retrieving a encoded image from the memory 19 referenced in FIG. 1.

Step E1 is followed by step E2, which obtains the first visual component of the index. According to the preferred embodiment of the invention, this component is the histogram of colors of B values calculated from all the pixels of the image. This histogram $C_I = [c_1^I, c_2^I, \ldots, c_3^I]^T$ is stored in the memory 21 of FIG. 1. The calculation of the color histograms, which is well known to the person skilled in the art, will not be detailed any further. For fuller explanations on the histogram calculation reference can be made to the article entitled "Color Indexing", by M. J. Swan and D. H. Ballard, which appeared in "Int. J. Comput. Vision 7(1)", in 1991, pages 11 to 32. Any other method defining the color content of an image can of course be used.

Step E2 is followed by step E3, which makes it possible to obtain the second visual component of the index. According to the preferred embodiment of the invention, this component is a description of the texture of the image. This description consists of a vector of 12 pairs of values, that is to say 24 real values, which are the mean value and the standard deviation of the coefficients of 12 sub-bands obtained by a frequency decomposition of the image according to a set of Gabor filters. This vector $T_I = [t_1^I, t_2^I, \ldots, t_{24}^I]^T$ is stored in the memory 21 in FIG. 1. The calculation of this type of vector representing a description of the texture of the image will not be detailed any further. This calculation is well known to experts. However, for fuller explanations, reference can be made to the article entitled "Texture features for browsing and retrieval of image data", by B. S. Manjunath and W. Y. Ma, which appeared in "IEEE Transactions on Pattern Analysis and Machine Intelligence", Vol. 18, No. 8, in August 1996.

Returning to FIG. 3, step E3 is followed by step E4, which tests whether the current image is associated with an audio signal. If such is the case, step E4 is followed by step E5, which obtains from this audio signal the third and last component of the index. For this purpose, a known method is used which is described in detail in me article entitled "Content-based Indexing and Retrieval of Audio Data using Wavelets", by G. Li and A. A. Khokhar, which appeared in "University of Delaware, Department of Electrical and Computer Engineering, Newark, Del. 19716", in 1998.

The audio signal is in fact first of all decomposed into wavelets, so as to obtain a decomposition of the signal into S sub-bands. Next, the coefficients of each sub-band are analyzed so as to extract three statistical values:

1) The rate of passing through zero of the signal
2) The standard deviation of the signal
3) The mean of the signal.

The third component of the index associated with the image will therefore be composed of a vector of 3×S real values, $A_I = [a_1^I, a_2^I, \ldots, a_{3S}^I]^T$ where S designates the number of sub-bands. This vector is then stored in the memory 21 of FIG. 1.

The indexing methods will not be detailed any further since the choice of these methods in no way modifies the implementation of the invention.

A description will now be given, with reference to FIG. 4, of an algorithm illustrating the image search method according to the invention. This method consists of sorting the images contained in the memory 19 of FIG. 1, which were indexed according to the method described by FIG. 3.

This algorithm can be, totally or partially, memorized in any storage medium capable of cooperating with the controller 70. This storage medium is integrated or can be detachably mountable on the image search device. For example, the storage medium is a floppy disk, or a CD-ROM.

Figure 7:
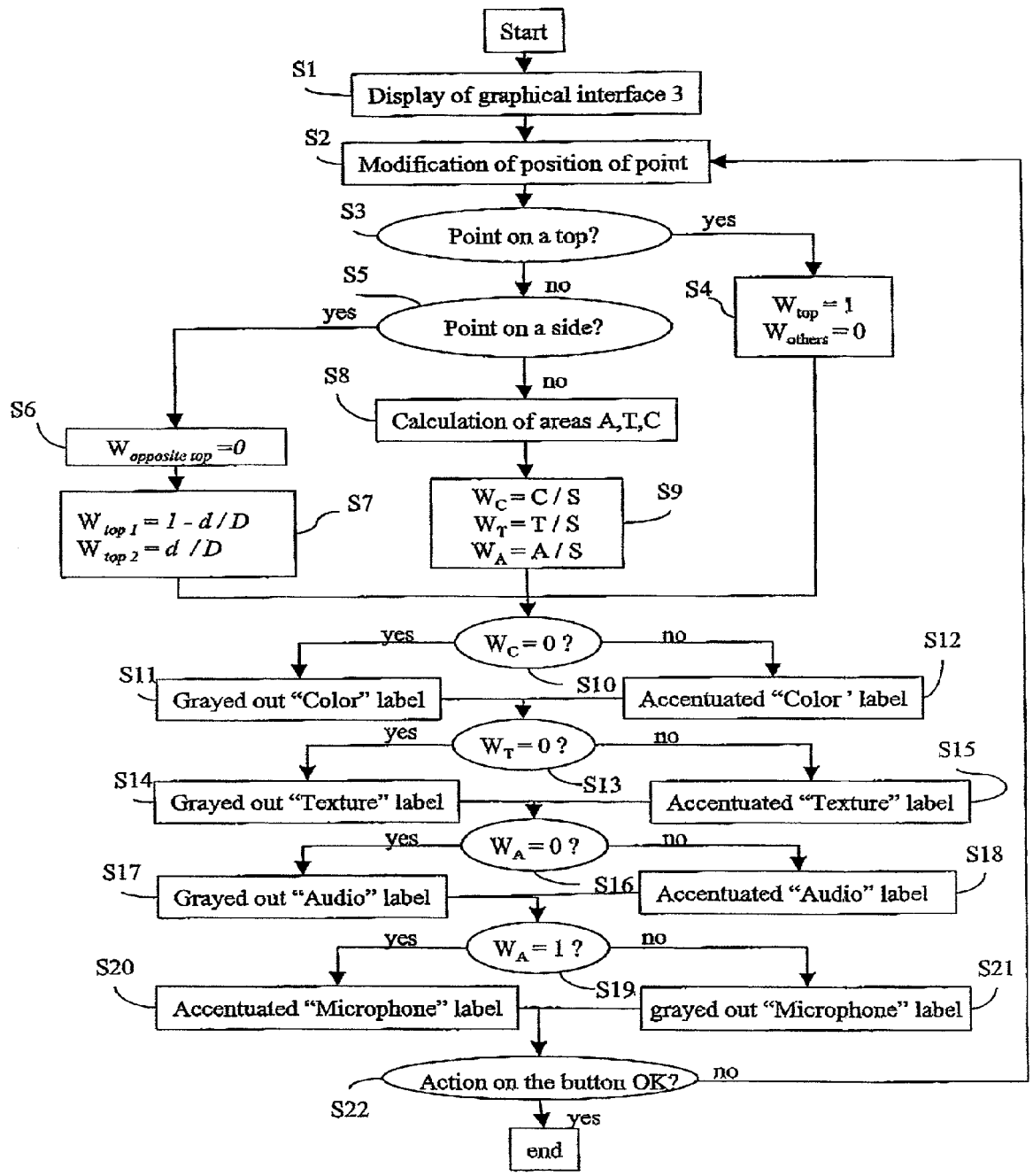
FIG. 7 is an algorithm illustrating the parameter validation method according to the invention.

Step E10 refers to the parameter validation method which will be found in detail in the description of FIG. 7. This method consists in fact of defining parameters which will make it possible to orient the search. These parameters are, in the preferred embodiment, three in number and are called $W_C$ for the color parameter, $W_T$ for the texture parameter and $W_A$ for the audio parameter. These parameters all have a value equal to or between 0 and 1. The sum of these three parameters is equal to 1.

Step E10 is followed by step E11, which tests whether the value $w_A$ is equal to 1. If such is the case, this means that the only parameter taken into account is the audio parameter. Step E11 is then followed by step E12, which validates the use of a microphone referenced at 15 in FIG. 1. This microphone will thus enable the user to record voice requests and thus carry out the search on the images which were previously associated with a voice message.

Step E12 is followed by step E13, during which the user vocally records an audio signal through the microphone. This signal is temporarily stored in the memory 21 of FIG. 1 and indexed according to the audio signal indexing method described by FIG. 3. The index $Q=(V_0, V_0, Q_A)$ thus obtained is temporarily stored in the memory 21. $V_0$ here designates a vector, all of whose components are zero.

Step E13 is followed by step E14, which considers the first image of the memory 19.

Step E14 is followed by step E15, which retrieves the index $I^i$ associated with the current image from the digital data memory 21 of FIG. 1.

Step E15 is then followed by step E16, which tests whether this index has an audio component. If such is the case, step E16 is followed by step E18, which associates with the current image a value of similarity $S(I^i, Q)$ between the index of the current image and the index Q defined during the recording of the audio request This similarity is calculated at step E30 according to equation (1), which will be found a little later in the description of this figure. This value is temporarily stored in the memory 21. This calculation then concerns only the audio component of the images to be sought It may be noted that $S(I^i, Q)$ is bounded at 1 because the distances calculated between each component of the index are bounded at 1 and the sum of the coefficients $W_C+W_T+W_A=1$.

If the test of step E16 is negative, step E16 is followed by step E17, which allocates a zero value to the similarity value. In fact, the current image then not having any audio component, it is not possible to compare it with the audio request defined subsequently.

Step E17 and E18 is then followed by step E19, Which tests whether the current image is the last image in the storage unit 10. If such is not the case, step E19 is followed by step E20, which considers the following image and returns to the previously described step E15.

If the test of step E19 is positive, step E19 is followed by step E21, which sorts the images by decreasing order according to the similarity value associated with them.

These images are then displayed at step E22 on the screen 16 of FIG. 1. These images are viewed so as to comply with the same decreasing order of the similarity value. The most similar images, that is to say those which have the highest associated similarity value, will be displayed first. In our preferred embodiment, the images are ordered from left to right from the highest value to the lowest value. Thus the images which have been allocated with a nil similarity value will come in last place after the sorting step E21 and will be displayed in the last position at step E22. They will therefore be easily locatable by the user, especially if the value of the similarity is displayed at the same time as the image, which can perfectly well be envisaged in particular embodiment. In another particular embodiment of the invention, it can also be envisaged that the images having a nil similarity value are not displayed. The user can then be led to change his request, if he deems that the images including audio information are not sufficient. He may also record audio information for the images included in the memory 19 which do not have any. The method stops after the display step.

If the test of step E11 is negative, step E11 is followed by step E23, which deactivates the functionality of the microphone, thus not allowing its use. In the preferred embodiment, the microphone is in fact activated only when the parameter $W_A$ is equal to 1.

At step E23, all the images in the memory 19 are also displayed on the screen 16 of the figure. According to a preferred embodiment of the invention, the first N images are displayed using a grid composed of 5 rows and 4 columns (N=20). Each image is displayed in one of the boxes of this grid. It may be remarked that the user has the possibility of displaying all the images in the memory 19 in groups of N images by acting on the input device 22. According to a preferred embodiment of the invention, two buttons are provided for this purpose. The first makes it possible to display the following N images and the other button the previous N images. These buttons are not shown.

Step E23 is followed by step E24, during which the user selects an example image amongst the images displayed on the screen, through an input means. According to a preferred embodiment of the invention, two buttons "+" and "−" are provided for this purpose. The "+" button makes it possible to select the image following the one currently selected, and the "−" button makes it possible to select the previous image. These buttons are not shown. It may be noted that, in accordance with the preferred embodiment of the invention, the border of the box containing the currently selected image is accentuated, thus enabling the user to be able to display the currently selected image. The image selected by default is the one at the top left of the screen.

Step E24 is followed by step E25, which retrieves the index Q associated with the image thus selected and which becomes the example image. Step 25 is followed by step E26 which, like step E14, considers the first image in the memory 19.

At step E27, the index of the current image is retrieved from the digital data memory 21. Step E27 is then followed by step E28, which tests whether the index of the current image has an audio component. If such is the case, step E28 is followed by step E30 which, like step E18, associates with the current image a value of similarity $S(I^i, Q)$ between the index of the current image and the index Q of the example image. In this precise case, the calculation would be made on the three components defining the image. This similarity is calculated according to equation (1) below and temporarily stored in the memory 21.

$$S(I^i,Q)=1-(w_c d(C_I,C_Q)+w_T d(T_I,T_Q)+w_A d(A_I, A_Q)) \qquad (1)$$

with $$d(C_I, C_Q) = \sqrt{\frac{\sum_{j=1}^{B}\left(c_j^I - c_j^Q\right)^2}{\alpha_C}}$$

$$d(T_I, T_Q) = \sqrt{\frac{\sum_{j=1}^{24}\left(t_j^I - t_j^Q\right)^2}{\alpha_T}}$$

$$d(A_I, A_Q) = \sqrt{\frac{\sum_{j=1}^{35}\left(a_j^I - a_j^Q\right)^2}{\alpha_A}}$$

where

-continued $$\alpha_C = \begin{cases} 1 & \text{if } \max_{j=1,B}(c_j^I - c_j^Q) = 0 \\ B \cdot \max_{j=1,B}(c_j^I - c_j^Q)^2 & \text{if } \max_{j=1,B}(c_j^I - c_j^Q) \neq 0 \end{cases}$$

$$\alpha_T = \begin{cases} 1 & \text{if } \max_{j=1,24}(t_j^I - t_j^Q) = 0 \\ 24 \cdot \max_{j=1,24}(t_j^I - t_j^Q)^2 & \text{if } \max_{j=1,24}(t_j^I - t_j^Q) \neq 0 \end{cases}$$

$$\alpha_A = \begin{cases} 1 \\ 3 \cdot S \cdot \max_{j=1,3S}(a_j^I - a_j^Q) & \text{if } \max_{j=1,3S}(a_j^I - a_j^Q) \neq 0 \end{cases}$$

It will be recalled that $S(I^t, Q)$ is bounded at 1 because the distances calculated between each component of the index are bounded at 1 and the sum of the coefficients $w_C + w_T + w_A = 1$. Thus a zero similarity value means that there is no similarity between the two images compared and conversely a similarity value of 1 means that the two compared images are identical.

If at step E28 the response is negative, step E29 allocates a zero value to $w_A$, defining the audio parameter. The similarity calculation will then not take account of the audio component. Step E29 is followed by the previously described step E30. Thus, at step E30, the similarity calculation will be made only on the first two parameters of the current image. step E30 is followed by step E31, which tests whether the current image is the last image of the memory 19. If such is not the case, step E31 is followed by step E32, which considers the following image and returns to the previously described step E27. If the test at step E31 is positive, step E31 is followed by the previously described step E21.

With reference to FIG. 5, a description will now be given of an example of a representation of the graphical interface of the parameter validation device according to the invention, wherein at least one of the parameters is validated according to the position of the point compared to the tops of the polygons. This graphical interface 3 enables a user to define a search on the parameters defining a digital image.

To do this, the parameters which can be validated are represented by the tops of a polygon which, in the preferred embodiment of the invention, is a triangle. In the case of a triangle, the parameters are for example color, texture and audio parameters. The graphical interface thus represents the triangle and the definition or label of the three parameters close to their respective tops.

At least one functionality can be associated with at least one parameter. The definitions or labels of these functionalities are also represented close to the top representing the associated parameter. These functionalities can be in the form of a device as in our example embodiment where the audio parameter is associated with a microphone. The name or label of the device is then displayed close to the top representing the associated parameter. Here the microphone can therefore be validated if the audio parameter is also validated.

Figure 6B:
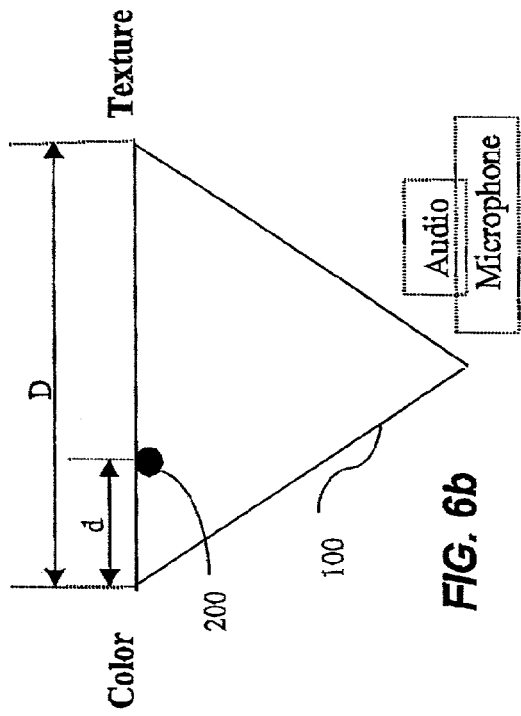
FIGS. 6a, 6b, 6c and 6d depict a few examples of the position of the point in the graphical interface of the parameter validation device according to the invention.
Figure 6D:
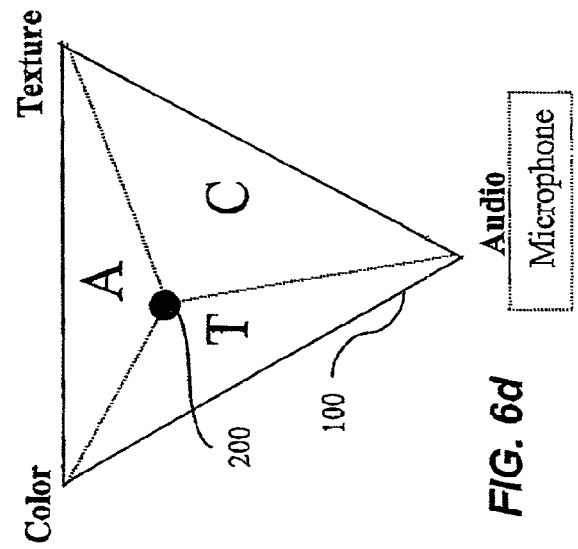
Figure 6A:
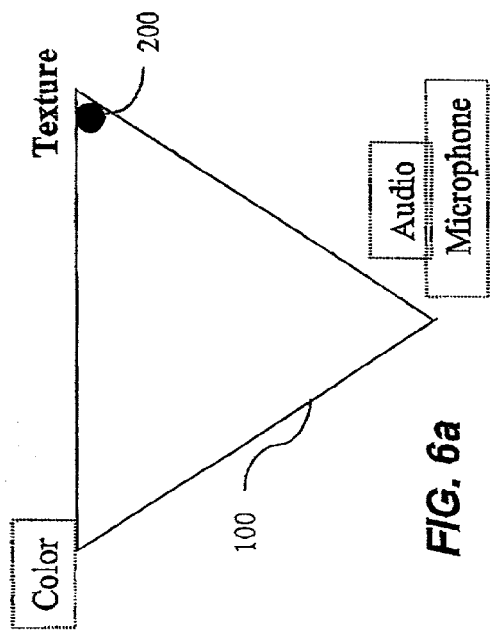
Figure 8:
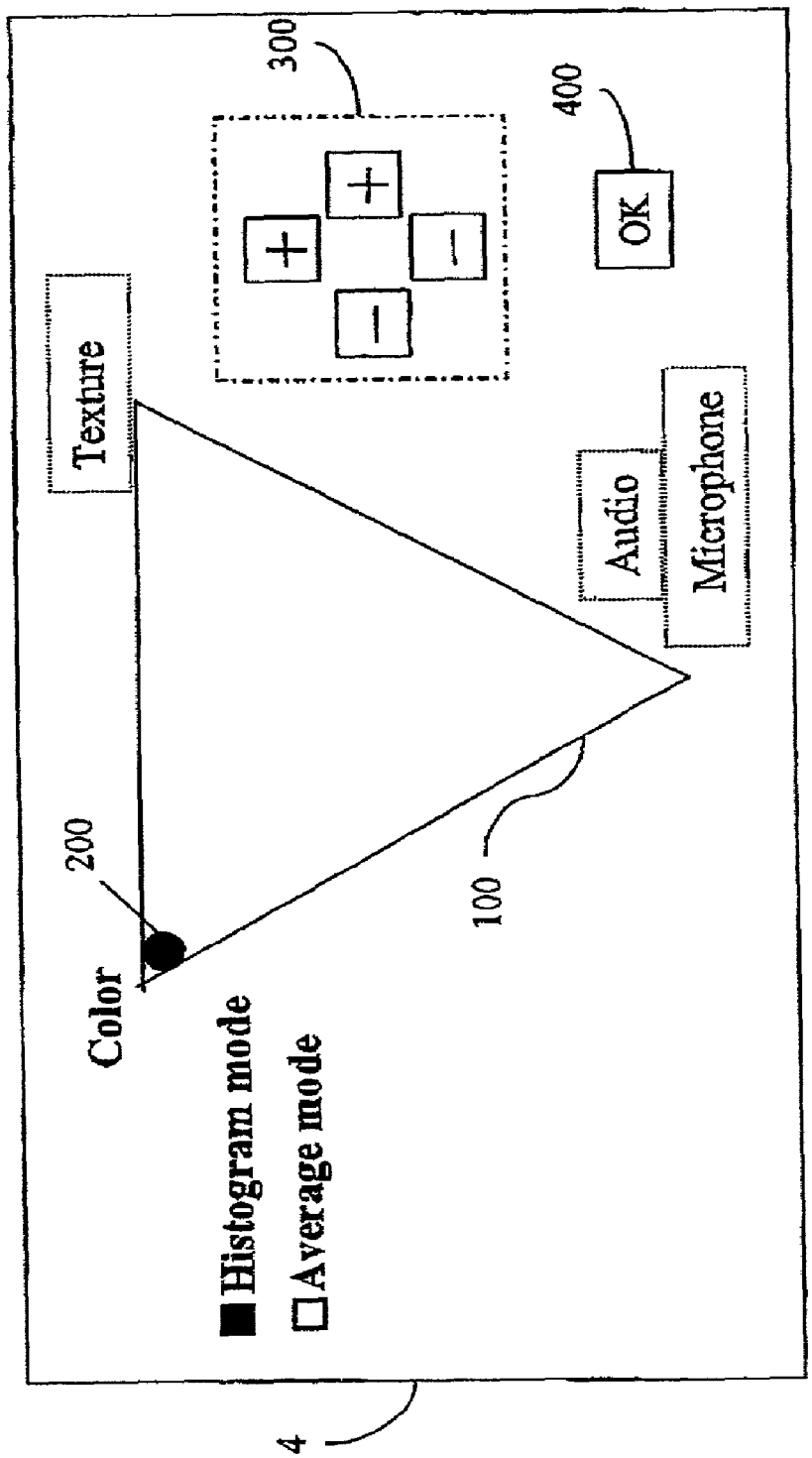
FIG. 8 depicts another example of the embodiment of the graphical interface of the parameter validation device according to the invention.

It will be seen in the description of FIGS. 6a, b, c and d in which case this validation will be possible. The parameters and the associated functionalities are validated according to the position of a movable point in the polygon. Thus the distance between one of the tops of the polygon and the point defines the weight to be allocated to the parameter represented by this top. Examples of positions of the point in the triangle and the weights of the parameters thus selected will be seen in the description of FIGS. 6a, b, c and d. When point A has a position such that a parameter can be validated, the label associated with the top and defining the parameter is accentuated by a view in bold characters. Conversely, if a parameter cannot be validated by the position of the point, the label of this parameter is depicted as semi-transparent or grayed out, or even invisible, characters, so as to indicate to the user that this parameter cannot be selected. The same applies to the functionalities or associated devices. Thus the intensity of the display of the parameters varies according to the position of the point. In the embodiment described here, the display of the parameter changes from a display in bold characters to a display in gray-tinted characters depending on whether or not it can be selected. It is also entirely possible to gradually vary the intensity of the display according to the weight to be allocated to the parameter in agreement with the position of the point. In FIGS. 5, 6 and 8, the grayed out parameter labels are represented by labels framed in dotted lines, for reasons of legibility.

The parameter validation device thus depicted has means of positioning the point, consisting of a pointer represented by the point 200 moving in the polygon, here a triangle 100, by acting on the input means 300. This input means is for example a set of four buttons which make it possible to make the point move vertically and horizontally within the triangle. Each time one of these buttons is pressed, the point 200 moves by one unit. This interface also includes the button 400, which makes it possible to, validate a position of the point and to initiate the search method of FIG. 4. This input means 300 for moving the point in the polygon and this means 400 for validating the position of the point are displayed on the same screen 16 as the polygon.

With reference to FIGS. 6a, 6b, 6c and 6d, a description will now be given of examples of a position of the point 200 in the triangle. The spatial position of the point 200 then makes it possible to determine the triplet ($w_C$, $w_T$, $w_A$) representing the numerical values of the parameters respectively of color, texture and audio. This triplet of data is useful during the search method which has been described above in FIG. 4. According to the preferred embodiment of the invention, these values correspond to the barycentric coordinates of the point situated within a triangle. It will be recalled that the sum of these coordinates is always equal to 1.

Thus, in FIG. 6a, the point is positioned on the top of the triangle which represents the texture parameter. The label of this parameter is then displayed in bold characters whilst the others, which can therefore no longer be selected, are displayed in grayed out characters. The user can then clearly see the parameter which he has chosen. The numerical values of the parameters are then: ($w_C=0$, $w_T=1$, $w_A=0$).

In FIG. 6b, the point 200 is positioned on one of the Aides of the triangle. In this case, the numerical values of the parameters depend on the distance of the point with respect to the tops representing the parameters in question. Thus, if the point 200 is at the distance d from the top representing the color parameter, the numerical value $w_c$ is equal to d/D whilst the numerical value $w_T$ is equal to 1-d/D, D being the length of the side of the triangle, which is isosceles in the present case. The numerical values of the parameters are then $$\left( w_C = \frac{d}{D}, w_T = 1 - \frac{d}{D}, w_A = 0 \right).$$

It can therefore be seen that two parameters are selected. Their label therefore appears in accentuated characters whilst the parameter not selected and its associated functionality appear in grayed out characters.

Figure 6C:
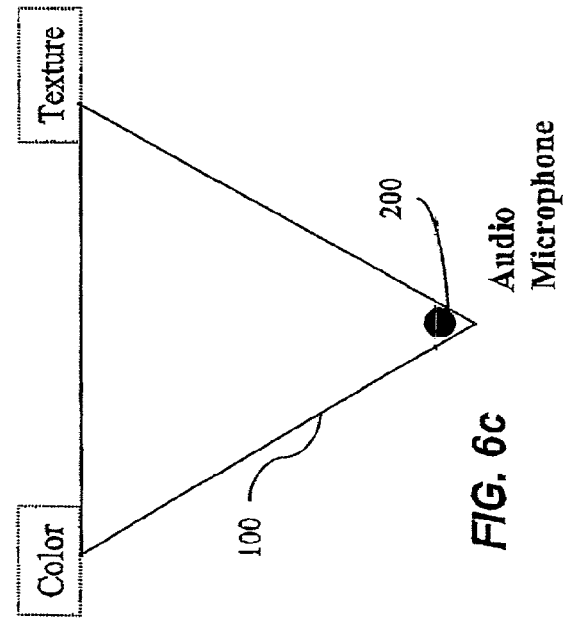

In FIG. 6c, the point 200 is positioned on the top representing the audio parameter. The digital values of the parameters are then ($w_C=0$, $w_T=0$, $w_A=1$). The label characterizing the audio parameter is then visually accentuated whilst the others are in grayed out characters. However, the audio parameter, being associated with a functionality, which in the present case is a device consisting of a microphone, the label of this functionality is also visually accentuated in order to warn the user that the microphone device is active and that the request can thus be recorded vocally. This microphone is activated, in this embodiment, only when the audio parameter has a numerical value of 1.

In FIG. 6d, the point 200 is inside the triangle 100 and thus defines the surfaces A, T and C of the three triangles inscribed in the original triangle with surface area S. Thus there will be allocated to the color parameter the numerical value $$w_C = \frac{\text{area } C}{\text{area of the triangle}} = \frac{C}{S},$$

to the texture parameter, the numerical value $$w_T = \frac{\text{area } T}{\text{area of the triangle}} = \frac{T}{S}$$

and to the audio parameter, the numerical value $$w_A = \frac{\text{area } A}{\text{area of the triangle}} = \frac{A}{S} = 1 - \left( \frac{C}{S} + \frac{T}{S} \right).$$

The sum of the 3 numerical values of the parameters is in fact equal to 1. The numerical value triplet is therefore $$\left( w_C = \frac{C}{S}, w_T = \frac{T}{S}, w_A = 1 - \left( \frac{C}{S} + \frac{T}{S} \right) \right).$$

The figure thus represents the labels of the three parameters thus selected in an accentuated fashion, which informs the user that the three parameters will be taken into account in the search process. On the other hand, the functionality associated with the audio parameter is in grayed out characters, and is therefore not activated. This is because the audio parameter not having the numerical value of 1, in this embodiment, the microphone is not activated. The request can therefore not be made vocally, but the search will take into account the audio parameter of an example image, taking account of the weight allocated to this audio parameter in FIG. 6d.

With reference to FIG. 8, a description will be given of another example embodiment of the parameter validation device here represented by its graphical interface 4.

The figure has a great deal of similarity with the previously described FIG. 5. The only difference lies in the selection of the color parameter where, in this embodiment, it can be envisaged that the user can choose between two different calculation modes when seeking a similarity between the example image and the other images in the memory 19. This can for example be a calculation mode based on histograms as described in the preferred embodiment of the invention. This may also be a calculation mode based on the average of the color component on the image. This calculation mode is not described but can perfectly well be envisaged. The user therefore has the possibility of choosing between these two calculation modes selecting one mode amongst the two offered. A small square situated close to the label describing the required mode will then be darkened, thus indicating to the user the mode which he has actually chosen. In this other embodiment, the images in the memory 19 have been indexed according to the two possible calculation modes for the color parameter. At the time of the request from the user and according to the mode which he has chosen, the similarity search will then take place on the index corresponding to the calculation mode. This other embodiment is a non-limiting example, and it is in fact possible to extend the choices of calculation mode for one or more parameters thus offering different functionalities for these parameters.

Another embodiment will consist of representing a plurality of parameters by a single top. This plurality of parameters can for example relate to a common characteristic of the image. The plurality of parameters and the common characteristic of the image will be displayed close to the corresponding top. Thus, by moving the point towards the top representing this plurality of parameters, the user chooses to make a search on the corresponding characteristic of the image. Instead of having to select several parameters, he only has to choose the plurality of parameters, which further facilitates his action.

With reference to FIG. 7 a description will now be given of the algorithm illustrating the parameter validation method according to the invention.

This algorithm can be, totally or partially, memorized in any storage medium capable of cooperating with the controller 14. This storage medium is integrated or can be detachably mountable on the device. For example, the storage medium is a floppy disk, or a CD-ROM.

Step S1 is an initialization step during which the graphical interface of FIG. 5 is displayed on the screen 16 of FIG. 1. The point 200 is positioned by default, at the initial stage, at the top left of the triangle 100 in FIG. 5. The values of the initial triplet are equal to (1,0,0) stipulating that by default the search is based solely on the color.

Step S1 is followed by step S2 during which the user modifies the current position of the point 200 by means of the buttons 300 of the graphical interface 3.

Step S2 is followed by step S3, which tests whether the point is situated on a top of the triangle. If such is the case, step S3 is followed by step S4, which allocates the value 1 to the component of the triplet which is associated with this top and the value 0 to the other components of the triplet.

Step S4 is followed by step S10, which tests whether the value of the first component of the triplet $w_c$ is zero. If such is the case, step S10 is followed by step S11, which displays the label "Color" in grayed out or semi-transparent characters on the screen.

If such is not the case, step S10 is followed by step S12, which displays the label "Color" in an accentuated fashion on the screen.

Steps S11 and S12 are followed by step S13, which tests whether the value of the second component of the triplet $w_T$ is zero. If such is the case, step S13 is followed by step S14, which displays the label "Textures" in grayed out or semi-transparent characters on the screen.

If such is not the case, step S13 is followed by step S15, which displays the label "Texture" in an accentuated fashion on the screen.

S14 and S15 are followed by step S16, which tests whether the value of the third component of the triplet $w_A$ is zero. If such is the case, step S16 is followed by step S17, which displays the label "Audio" in grayed out or semi transparent characters on the screen.

If such is not the case, step S16 is followed by step S18, which displays the label "Audio" in accentuated fashion on the screen.

Steps S17 and S18 are followed by step S19, which tests whether the value of the third component of the triplet $w_A$ is equal to 1. If such is the case, step S19 is followed by step S20, which displays the label "Microphone" corresponding to the functionality associated with the audio parameter, in an accentuated fashion on the screen.

If such is not the case, step S19 is followed by step S21, which displays the label "Microphone" in grayed out or semi-transparent characters on the screen.

Steps S20 and S21 are followed by step S22, which tests whether an action on the button 400 in FIG. 5 has been carried out by the user. If such is not the case, step S22 is followed by the previously described step S2. If such is the case, the process stops and the search method of FIG. 4 is initiated.

If the test at step 33 is negative, step S3 is followed by step S5, which tests whether the point is situated on a side of the triangle (FIG. 6*b*). If such is the case, step S5 is followed by step S6, which allocates the value 0 to the component of the triplet which is associated with the top opposite to this side.

Step S6 is followed by step S7, which calculates the distance d between a first top of the side (of length D) and the point. The value $$1 - \frac{d}{D}$$

is allocated to the component of the triplet associated with this first top and the value $$\frac{d}{D}$$

is associated with the component of the second top of this side.

Step S7 is followed by the previously described step S10.

If the test of step S5 is negative, step S5 is followed by step S8, which calculates the surface area A, T, C of the three triangles included in the original triangle of surface area S (FIG. 6*d*).

Step S8 is followed by step S9, which allocates the value $$\frac{C}{S}$$

to the first component of the triplet, the value $$\frac{T}{S}$$

to the second and the value $$1 - \left(\frac{C}{S} + \frac{T}{S}\right)$$

to the third. Step S9 is followed by the previously described step S10.

Naturally, many modifications can be made to the embodiments of the invention described above without departing from the scope of the invention.

Especially the parameter "Audio" can be disabled when the point 200 is on the line between "Color" and "Texture" as described in FIG. 6*b*. Also in the another system, the parameter "Audio" can be disabled when a certain line is drawn from the top of "Audio" to the opposite line through the point 200 and the distance from the point 200 to the opposite line is within 1% of the distance from the top of "Audio" to the opposite line. The percentage can be decided in accordance with the user's designation.

The invention claimed is:

1. Method of validating parameters defining an image, each parameter being represented by one of the tops of a polygon, a point being able to move in the polygon,
   wherein at least one of the parameters is validated according to the position of the point with respect to the tops of the polygon,
   and wherein at least one functionality is associated with the at least one parameter,
   and wherein a means for validating the position of the point in the polygon in order to validate the at least one parameter and/or the associated at least one functionality is displayed on the same screen as the polygon.

2. Parameter validation method according to claim 1, characterized in that the distance between one of the tops of the polygon and the point defines the weight to be allocated to the parameter represented by said top.

3. Parameter validation method according to claim 1, wherein the polygon is a triangle.

4. Parameter validation method according to claim 1, wherein one of the functionalities associated with a parameter is the use of a device.

5. Parameter validation method according to claim 4, characterized in that the device is a microphone.

6. Parameter validation method according to claim 4 or 5, characterized in that the polygon and a label representing the device are displayed on the same screen.

7. Parameter validation method according to claim 4 or 5, wherein the availability of the device is decided according to the position of the point and in that the intensity of the display of the label of the device varies according to whether or not the device is available.

8. Parameter validation method according to claim 3, wherein the parameters represented by the three tops of the triangle are color, texture and audio parameters.

9. Parameter validation method according to claim 1, wherein the point is situated at a predetermined position within the polygon at the initial stage.

10. Parameter validation method according to claim 9, characterized in that the predetermined position is close to one of the tops of the polygon.

11. Parameter validation method according to claim 1, wherein a means for moving the point in the polygon is displayed on the same screen as the polygon.

12. Parameter validation method according to claim 1, wherein the parameters are displayed and the intensity of the display of these parameters varies according to the position of the point.

13. Parameter validation method according to claim 1, wherein the parameters are displayed close to their respective top of the polygon.

14. Parameter validation method according to claim 1, wherein at least one of the tops of the polygon represents a plurality of parameters, it being possible to validate this plurality of parameters.

15. Parameter validation method according to claim 14, characterized in that the plurality of parameters relates to a common characteristic of the image.

16. Parameter validation method according to claim 15, characterized in that the plurality of parameters is displayed with the characteristic of the image close to the top of the polygon.

17. Device for validating parameters defining an image, each parameter being represented by one of the tops of a polygon, a point being able to move in the polygon, the device comprising:
- means for positioning the point with respect to the tops of the polygon in order to validate at least one of the parameters;
- means for associating at least one functionality with the at least one parameter; and
- means for validating the position of the point in the polygon in order to validate the at least one parameter and/or the associated at least one functionality, said means for validating being displayed on the same screen as the polygon.

18. Parameter validation device according to claim 17, wherein the means for positioning the point consist of a pointer and an input means, said pointer being the point moving in the polygon through action on the input means.

19. Method of seeking images amongst a plurality of images stored in a database, each of the stored images being associated with an item of data called the stored image index, representing at least one parameter of the image, characterized in that it includes at least one search parameter validation step according to the parameter validation method in accordance with claim 1.

20. Device for seeking images amongst a plurality of images stored in a database, each of the stored images being associated with an item of data called the stored image index, representing at least one parameter of the image, characterized in that it has means adapted to implement an image seeking method according to claim 19.

21. Device for seeking images amongst a plurality of images stored in a database, each of the stored images being associated with an item of data called the stored image index, representing at least one parameter of the image, characterized in that it has a parameter validation device according to claim 17 or 18.

22. Digital photographic apparatus, having an image seeking device according to claim 20.

23. Computer-readable storage medium storing a computer-executable program for implementing the method according to claim 1.

24. Storage medium according to claim 23, wherein said storage medium is a floppy disk or a CD-ROM.

25. A computer-executable program stored on a computer-readable storage medium and comprising computer executable instructions for causing a computer to validate parameters defining an image, according to claim 1.

* * * * *

UNITED STATES PATENT AND TRADEMARK OFFICE
CERTIFICATE OF CORRECTION

PATENT NO.         : 7,079,711 B2
APPLICATION NO.    : 10/094657
DATED              : July 18, 2006
INVENTOR(S)        : Lilian Labelle It is certified that error appears in the above-identified patent and that said Letters Patent is hereby corrected as shown below:

COLUMN 1:
Line 12, "2. Description of the Related Art" should be deleted;
Line 15, "images." should read -- images. ¶ 2. Description of the Related Art --; and
Line 23, "these(images," should read -- these images, --.

COLUMN 2:
Line 16, "thy" should read -- the --.

COLUMN 4:
Line 14, "Which" should read -- which --.

COLUMN 7:
Line 7, "a," should read -- a --; and
Line 62, "$c_3^I]^T$" should read -- $c_B^I]^T$ --.

COLUMN 8:
Line 27, "me" should read -- the --.

COLUMN 9:
Line 40, "Step E17 and E18 is" should read -- Steps E17 and E18 are -- and "Which" should read -- which --.

COLUMN 12:
Line 31, "to, validate" should read -- to validate --; and
Line 57, "Aides" should read -- sides --.

UNITED STATES PATENT AND TRADEMARK OFFICE
CERTIFICATE OF CORRECTION

PATENT NO. : 7,079,711 B2
APPLICATION NO. : 10/094657
DATED : July 18, 2006
INVENTOR(S) : Lilian Labelle It is certified that error appears in the above-identified patent and that said Letters Patent is hereby corrected as shown below:

COLUMN 17:
Line 19, "top" should read -- tops --.

Signed and Sealed this

Fifteenth Day of December, 2009

David J. Kappos
*Director of the United States Patent and Trademark Office*